(12) United States Patent
Xu et al.

(10) Patent No.: US 11,598,984 B2
(45) Date of Patent: Mar. 7, 2023

(54) BACKLIGHT ASSEMBLY AND DISPLAY DEVICE

(71) Applicants: Hefei Xinsheng Optoelectronics Technology Co., Ltd., Anhui (CN); BOE Technology Group Co., Ltd., Beijing (CN)

(72) Inventors: Haifeng Xu, Beijing (CN); Ran Tao, Beijing (CN); Jinfeng Zhang, Beijing (CN); Qingyi Zhuang, Beijing (CN)

(73) Assignees: HEFEI XINSHENG OPTOELECTRONICS TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/489,589

(22) Filed: Sep. 29, 2021

(65) Prior Publication Data

US 2022/0099884 A1 Mar. 31, 2022

(30) Foreign Application Priority Data

Sep. 30, 2020 (CN) .......................... 202022220863.3

(51) Int. Cl.
*G02F 1/1333* (2006.01)
*F21V 8/00* (2006.01)

(52) U.S. Cl.
CPC ..... *G02F 1/133314* (2021.01); *G02B 6/0055* (2013.01); *G02B 6/0088* (2013.01)

(58) Field of Classification Search
CPC .................. G02B 6/0055; G02F 1/133314
USPC ..................................... 349/58; 362/632–634
See application file for complete search history.

(56) References Cited

U.S. PATENT DOCUMENTS

| 2003/0011736 A1* | 1/2003 | Ha ........................ G06F 1/1601 349/149 |
| 2013/0128444 A1* | 5/2013 | Kuo .................. G02F 1/133608 361/679.21 |
| 2015/0309366 A1* | 10/2015 | Park .................. G02F 1/133308 445/24 |

* cited by examiner

*Primary Examiner* — Keith G. Delahoussaye
(74) *Attorney, Agent, or Firm* — IPro, PLLC

(57) ABSTRACT

A backlight assembly and a display device are provided in the present disclosure. The backlight assembly includes an optical lamination layer and a die-casting back plate. The die-casting back plate defines an accommodation space for accommodating the optical lamination layer, the die-casting back plate includes an inner surface and an outer surface arranged opposite to each other, the inner surface is a surface facing a bottom surface of the optical lamination layer, a recess region is arranged on the inner surface, and a plurality of rivets configured to assemble the die-casting back plate onto an object to be assembled is arranged on the outer surface. The plurality of rivets is located in a region corresponding to the recess region and spaced apart from a boundary of the recess region by a spacing.

20 Claims, 2 Drawing Sheets

BACKLIGHT ASSEMBLY AND DISPLAY DEVICE

CROSS-REFERENCE TO RELATED APPLICATIONS

This application claims priority to Chinese Patent Application No. 202022220863.3 filed in China on Sep. 30, 2020, which is incorporated herein by reference in its entirety.

TECHNICAL FIELD

The present disclosure relates to the field of display technology, in particular to a backlight assembly and a display device.

BACKGROUND

In the related art, a vehicle-mounted liquid crystal display screen has been widely used in the field of automobiles. A rotating screen has been further provided by some automobile manufacturers. The rotating screen may rotate by 90° under the control of a motor, so as to switch between a horizontal state and a vertical state. A die-casting back plate is used in a backlight assembly of a vehicle-mounted display screen in the relevant art, the backlight assembly and an entire machine are fixed onto a vehicle by using several screws, and the rotating screen switches between the horizontal state and the vertical state through the rotation of a motor.

SUMMARY

A display device is provided in the present disclosure, including: an optical lamination layer and a die-casting back plate. The die-casting back plate defines an accommodation space for accommodating the optical lamination layer, and includes an inner surface and an outer surface arranged opposite to each other. The inner surface is a surface facing a bottom surface of the optical lamination layer, a recess region is arranged on the inner surface, and a plurality of rivets configured to assemble the die-casting back plate onto an object to be assembled is arranged on the outer surface. The plurality of rivets is located in a region corresponding to the recess region and spaced apart from a boundary of the recess region by a spacing.

Illustratively, a central position of the recess region substantially coincides with a central position of the plurality of rivets.

Illustratively, a minimum distance between a center of any one of the plurality of rivets and the boundary of the recess region ranges from 10 mm to 20 mm.

Illustratively, a depth of the recess region in a direction perpendicular to the inner surface ranges from 0.2 mm to 0.3 mm.

Illustratively, a smooth transition structure is formed at a position where a level difference is formed between the boundary of the recess region and the inner surface.

Illustratively, an orthographic projection of the recess region onto the inner surface is of a rectangular, a circular, a rectangular, or any other regular or irregular shape.

Illustratively, the optical lamination layer includes a light-guiding plate, a reflection sheet and a light bar, the reflection sheet is located between the light-guiding plate and the die-casting back plate, the light bar is located at one side of the light-guiding plate and the reflection sheet, and a folded edge is arranged on at least one side of the other sides of the reflection sheet except the one side where the light bar is located, and is adhered and fixed to the light-guiding plate.

Illustratively, the reflection sheet is adhered and fixed to the inner surface in such a manner that at least two side edges of a surface of the reflection sheet facing the die-casting back plate are adhered and fixed to the inner surface.

Illustratively, one of four side surfaces of the light-guiding plate is a light-entering side surface, folded edges are arranged at three side edges of four side edges of the reflection sheet; and the remaining side surfaces of the four side surfaces of the light-guiding plate except the light-entering side surface are adhered and fixed to the folded edges of the reflection sheet, respectively.

Illustratively, the reflection sheet is adhered and fixed to the inner surface by using a first double-sided adhesive tape, and the folded edges are adhered and fixed to the side surfaces of the light-guiding plate by using a second double-sided adhesive tape.

Illustratively, the backlight assembly further includes a buffer member, the die-casting back plate includes a bottom portion and a side portion together enclosing the accommodation space, and the buffer is located in a gap between the light-guiding plate and the side portion.

Illustratively, the light-guiding plate and the reflection sheet are adhered and fixed to the buffer by using a third double-sided adhesive tape.

A display device is further provided in the present disclosure, including the above-mentioned backlight assembly.

Illustratively, the display device includes a vehicle-mounted rotating screen.

DETAILED DESCRIPTION

Figure 1:
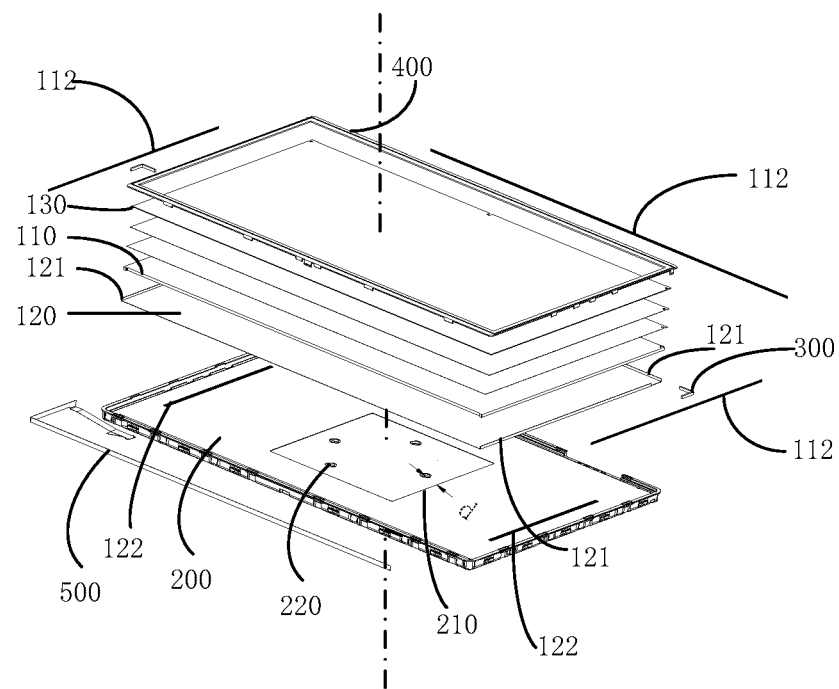
FIG. 1 shows a exploded view of a backlight assembly according to an embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

In the embodiments of the present disclosure, it should be appreciated that, such words as "in the middle of", "on/above", "under/below", "left", "right", "vertical", "horizontal", "inside" and "outside" may be used to indicate directions or positions as viewed in the drawings, and they are merely used to facilitate the description in the present disclosure, rather than to indicate or imply that a device or member must be arranged or operated at a specific position. In addition, such words as "first", "second" and "third" may be merely used to differentiate different components rather than to indicate or imply any importance.

Before the detailed description on the backlight assembly and the display device in the embodiments of the present disclosure, it is necessary to describe the related art as follows.

In the related art, a vehicle-mounted liquid crystal display screen has been widely used in the field of automobiles. A rotating screen has been further provided by some automobile manufacturers. The rotating screen may rotate by 90° under the control of a motor, so as to switch between a horizontal state and a vertical state. A die-casting back plate is used in a backlight assembly of a vehicle-mounted display screen in the relevant art, the backlight assembly and an entire machine are fixed onto a vehicle by using several screws, and the rotating screen switches between the horizontal state and the vertical state through the rotation of a motor. Since the vehicle-mounted display screen needs to operate in such an environment as high temperature, low temperature, and high-frequency vibration, which is stricter as compared with a consumer product. In the related art, a display defect occurs easily in the case that the vehicle-mounted display screen operates in a temperature-variable and high-frequency vibration environment.

It is found that, in the case that an entire multimedia system is mounted onto the vehicle through the cooperation of the several screw nuts and screws, when considering the aesthetics of the assembly of the backlight assembly and the vehicle, a size of a rotating mechanism cannot be too large and it also requires that a distance between the screws or rivets is very small during the design of the back plate. Since the vehicle-mounted display screen operates in such the environment as high temperature, low temperature, and high-frequency vibration, which is stricter as compared with the consumer product, corresponding reliability test requirements are also stricter. A composite vibration test needs to be carried out in an environment of a temperature ranging from −30° C. to 70° C. and a frequency ranging from 0 to 2000 Hz. It is further simulated that whether the display screen operates normally in the case that the vehicle is in the high or low temperature environment and under a bumpy road condition.

Due to a heavy weight of a rotating multimedia, the several screws or rivets are evenly distributed surrounding a rotation center (i.e., a center of the screen), and the distance between the rivets is very small, in the case that the rotating screen vibrates in a direction perpendicular to the screen, a resultant force on the die-casting back plate is concentrated at the center. Even though a strength of the die-casting back plate is much better than that of a stamped back plate, there is still a slight deformation at a central position, which is formed due to repeated depression and protrusion. In addition, at a low temperature of −30° C., the light-guiding plate contracts, and the light-guiding plate and the reflection sheet move in an accommodation space and meanwhile repeatedly collide with the die-casting piece at a deformation position thereof. Dots arranged on the light-guiding plate of the vehicle-mounted product in a mesh-like manner are formed by etching, which are poor wear resistance. A dot surface of the light-guiding plate is damaged during the collision, a white spot may occur at the central position of the backlight assembly, which may seriously affect the viewing effect. In the case that an amount of interference between a buffer and the light-guiding plate is increased, to limit the movement of the light-guiding plate, the light-guiding plate may have insufficient elongation space under high temperature conditions, and a new image defect may occur due to a bulge at the central position. Therefore, how to limit the movement of the light-guiding plate and prevent the die-casting piece from repeatedly colliding with the reflection sheet and the light-guiding plate becomes a challenge in a backlight design of the rotating screen.

In order to solve the above-mentioned problems, a backlight assembly and a display device are provided in the embodiments of the present disclosure, so as to mitigate the display defect.

Figure 2:
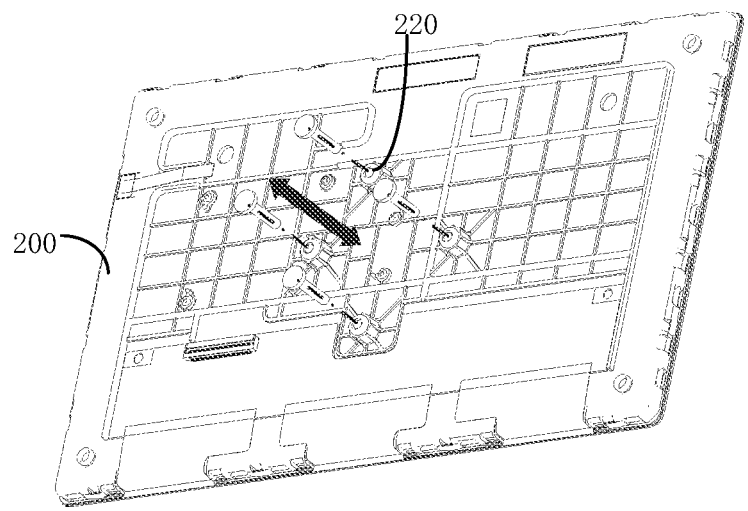
FIG. 2 shows a perspective view of an outer surface of a die-casting back plate of the backlight assembly according to an embodiment of the present disclosure.
Figure 3:
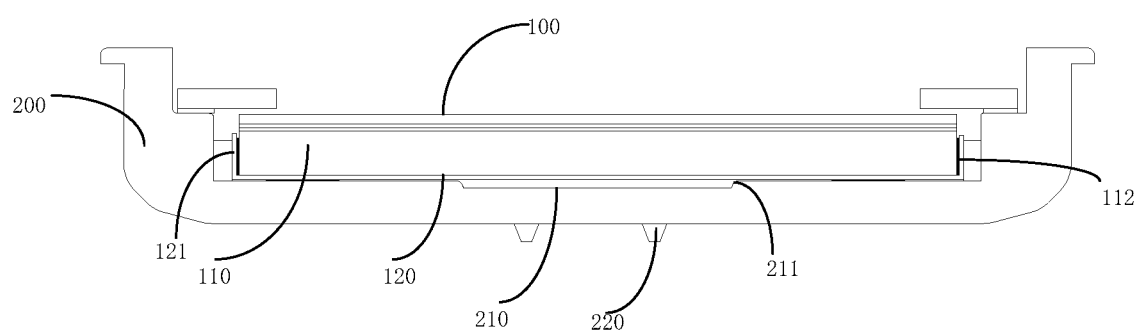
FIG. 3 is cross-sectional view of the backlight assembly according to an embodiment of the present disclosure.

As shown in FIGS. 1 to 3, the backlight assembly includes: an optical lamination layer 100 and a die-casting back plate 200. The die-casting back plate 200 defines a space for accommodating the optical lamination layer 100, and includes an inner surface and an outer surface arranged opposite to each other. The inner surface is a surface facing a bottom surface of the optical lamination layer 100, a recess region 210 is arranged on the inner surface, and a plurality of rivets 220 configured to assemble the die-casting back plate 200 onto an object to be assembled is arranged on the outer surface. The plurality of rivets 220 is located in a region corresponding to the recess region 210 and spaced apart from a boundary of the recess region 210 by a spacing.

In the backlight assembly of the embodiment of the present disclosure, the plurality of rivets 220 is arranged on the outer surface of the die-casting back plate 200 and configured to assemble the backlight assembly onto the object to be assembled (such as a vehicle body). Since a region of the die-casting back plate 200 having a largest deformation under a force is near the central position of the plurality of the rivets 220, the closer is it to a peripheral region of the die-casting back plate 200, the smaller a deformation amount of the corresponding die-casting back plate is, the recess region 210 is arranged on the inner surface along a direction from the central position of the plurality of the rivets 220 to the peripheral region of the die-casting back plate 200. Thus, it is able to prevent a region of the die-casting back plate 200 where the plurality of rivets 220 are arranged from being deformed too much and colliding with a light-guiding plate 110, thereby mitigating the display defect.

In some embodiments, a central position of the recess region substantially coincides with the central position of the plurality of rivets.

In some embodiments, in the case that the backlight assembly is applied to a rotating screen, when the backlight assembly and the rotating screen are assembled onto the to-be-assembled object via the plurality of rivets, the plurality of rivets 220 may be evenly distributed surrounding the rotation center (i.e., the center of the rotating screen), and are intensively arranged in a central region of the die-casting back plate 200, so as to meet the requirement on aesthetics of the assembly.

In some embodiments, the optical lamination layer 100 may include various optical film layers 130, such as a reflection sheet 120, the light-guiding plate 110, a diffuser, and a prism, and the reflection sheet 120 is located between the light-guiding plate 110 and the die-casting back plate 200.

In some exemplary embodiments, a minimum distance d between a center of any one of the plurality of rivets 220 and the boundary of the recess region 210 ranges from 10 mm to 20 mm. Optionally, d ranges from 10 mm to 15 mm.

In some embodiments, a depth h of the recess region 210 in a direction perpendicular to the inner surface ranges from 0.2 mm to 0.3 mm.

In this way, it is able to effectively prevent the central region of the die-casting back plate 200 from being deformed and colliding with the reflection sheet 120 and the light-guiding plate 110. It should be appreciated that specific parameters of the recess region 210 are not limited thereto in practical applications.

Furthermore, in some embodiments, as shown in FIGS. 1 to 3, an orthographic projection of the recess region 210 onto the inner surface is of a rectangular, a circular, a rectangular, or any other regular or irregular shape.

Furthermore, in some embodiments, a smooth transition structure 211 is formed at a position where a level difference is formed between the boundary of the recess region 210 and the inner surface.

In this way, it is able to avoid a defect due to a friction between the reflection sheet 120 and the die-casting back plate 200 at the position where the level difference is formed.

Furthermore, in some embodiments, the reflection sheet 120 is adhered and fixed to the inner surface in such a manner that at least two side edges of a surface of the reflection sheet facing the die-casting back plate 200 are adhered and fixed to the inner surface.

In some embodiments, the optical stack of the optical lamination layer 100 includes the light-guiding plate 110, the reflection sheet 120 and a light bar 500. The reflection sheet 120 is located between the light-guiding plate 110 and the die-casting back plate 200, the light bar 500 is located at one side of the light-guiding plate 110 and the reflection sheet 120, and a folded edge 121 is arranged on at least one side of the other sides of the reflection sheet 120 except the one side where the light bar 500 is located, and is adhered and fixed to the light-guiding plate 110.

In the above-mentioned solution, the reflection sheet 120 is adhered and fixed to the inner surface of the die-casting back plate 200, and the folded edge 121 is arranged on the reflection sheet 120, and adhered and fixed to the light-guiding plate 110. In this way, it is able to effectively limit a movement of the light-guiding plate 110 relative to the die-casting back plate 200, so as to prevent the die-casting back plate from colliding with the light-guiding plate 110 and the reflection sheet 120.

In some exemplary embodiments, the backlight assembly is an edge-type backlight assembly, one of four side surfaces of the light-guiding plate 110 is a light-entering side surface, folded edges 121 are arranged at three side edges of four side edges of the reflection sheet 120, and the remaining side surfaces of the four side surfaces of the light-guiding plate 110 except the light-entering side surface are adhered and fixed to the folded edges 121 of the reflection sheet 120, respectively.

In the above-mentioned solution, the reflection sheet 120 is adhered and fixed to the die-casting back plate 200, three edges of the reflection sheet 120 at non-light-entering sides (light-bar-free sides) thereof are folded, and the resultant folded edges are adhered and fixed to three non-light-entering side surfaces of the light-guiding plate 110 respectively. In this way, even if the light-guiding plate contracts under low temperature conditions, the light-guiding plate and the reflection sheet are fixed onto the die-casting back plate, so as to avoid the movement of the light-guiding plate. In addition, the recess region is arranged at the central position, even if the die-casting back plate is deformed, it may not collide with the reflection sheet and the light-guiding plate, so as to avoid the abrasion of dots arranged on the light-guiding plate in a mesh-like manner, which may affect the picture quality adversely.

Furthermore, in some embodiments of the present disclosure, the reflective sheet 120 is adhered and fixed to the inner surface by using a first double-sided tape 122, and the folded edges 121 are adhered and fixed to the side surfaces of the light-guiding plate 110 by using a second double-sided adhesive tape 112. In this way, it is able to simplify a structure and facilitate the assembling.

It should be appreciated that, in practical applications, there may be various fixing manners between the reflection sheet 120 and the die-casting back plate 200, and between the reflection sheet 120 and the light-guiding plate 110, which is not particularly defined herein.

Furthermore, as shown in FIGS. 1-3, the backlight assembly further includes a buffer 300, the die-casting back plate includes a bottom portion and a side portion together enclosing the accommodation space, and the buffer 300 is located in a gap between the light-guiding plate 110 and the side portion.

In the above-mentioned solution, the buffer may limit the movement of the light-guiding plate 110, and further meet the movement requirements during thermal expansion and contraction of the light-guiding plate 110. Illustratively, the buffer may be a silicone piece.

In some embodiments, the light-guiding plate and the reflection sheet are adhered and fixed to the buffer by using a third double-sided adhesive tape.

In the embodiments of the present disclosure, the backlight assembly may be applied to the display device, in particular to a vehicle-mounted rotational screen. In the above-mentioned backlight assembly, although the die-casting back plate is deformed during a vibration process in the temperature-variable and high-frequency vibration environment, the deformation of the die-casting back plate may not collide with the reflective sheet and the light-guiding plate. In addition, the light-guiding plate and the reflection sheet are firmly fixed to the back plate, and may not move in the accommodation space, so as to avoid the occurrence of white spots due to damage of dots arranged on the light-guiding plate in a mesh-like manner.

In addition, it should be appreciated that the backlight assembly in the embodiments of the present disclosure includes other structures of a conventional backlight assembly apart from the above structures, such as a plastic frame 400 and the light bar 500.

In addition, the display device is further provided, including the backlight assembly in the embodiments of the present disclosure.

The display device may be any product or component having a display function, such as a liquid crystal television, a liquid crystal display, a digital photo frame, a mobile phone, a tablet computer, etc. The display device further includes a flexible circuit board, a printed circuit board and a backboard. In particular, the display device may be used as the vehicle-mounted rotating screen, which is fixed to the vehicle body via the rivets 220.

Some descriptions will be given as follows.

(1) The drawings merely relate to structures involved in the embodiments of the present disclosure, and the other structures may refer to those known in the art.

(2) For clarification, in the drawings for describing the embodiments of the present disclosure, a thickness of a layer or region is zoomed out or in, i.e., these drawings are not provided in accordance with an actual scale. It should be appreciated that, in the case that such an element as layer, film, region or substrate is arranged "on" or "under" another element, it may be directly arranged "on" or "under" the other element, or an intermediate element may be arranged therebetween.

(3) In the case of no conflict, the embodiments of the present disclosure and the features therein may be combined to acquire new embodiments.

The above embodiments are merely for illustrative purposes, but shall not be construed as limiting the scope of the present disclosure. The scope of the present disclosure shall be subject to the scope defined by the appended claims.

What is claimed is:

1. A backlight assembly, comprising:
an optical lamination layer and a die-casted back plate, wherein the die-casted back plate defines an accommodation space for accommodating the optical lamination layer, and comprises an inner surface and an outer surface arranged opposite to each other, wherein the inner surface is a surface facing a bottom surface of the optical lamination layer, a recess region is arranged on the inner surface, and a plurality of rivets configured to assemble the die-casted back plate onto an object to be assembled is arranged on the outer surface; wherein the plurality of rivets is located in a region corresponding to the recess region and spaced apart from a boundary of the recess region by a spacing;
wherein a smooth transition structure is formed at a position where a level difference is formed between the boundary of the recess region and the remainder of the inner surface.

2. The backlight assembly according to claim 1, wherein a central position of the recess region substantially coincides with a central position of the plurality of rivets.

3. The backlight assembly according to claim 1, wherein a minimum distance between a center of any one of the plurality of rivets and the boundary of the recess region ranges from 10 mm to 20 mm.

4. The backlight assembly according to claim 1, wherein a depth of the recess region in a direction perpendicular to the inner surface ranges from 0.2 mm to 0.3 mm.

5. The backlight assembly according to claim 1, wherein an orthographic projection of the recess region onto the inner surface is of a rectangular, a circular, a rectangular, or any other regular or irregular shape.

6. A backlight assembly, comprising:
an optical lamination layer and a die-casted back plate, wherein the die-casted back plate defines an accommodation space for accommodating the optical lamination layer, and comprises an inner surface and an outer surface arranged opposite to each other, wherein the inner surface is a surface facing a bottom surface of the optical lamination layer, a recess region is arranged on the inner surface, and a plurality of rivets configured to assemble the die-casted back plate onto an object to be assembled is arranged on the outer surface; wherein the plurality of rivets is located in a region corresponding to the recess region and spaced apart from a boundary of the recess region by a spacing;
wherein the optical lamination layer comprises a light-guiding plate, a reflection sheet and a light bar, the reflection sheet is located between the light-guiding plate and the die-casted back plate, the light bar is located at one side of the light-guiding plate and the reflection sheet, and a folded edge is arranged on at least one side of the other sides of the reflection sheet except the one side where the light bar is located, and is adhered and fixed to the light-guiding plate.

7. The backlight assembly according to claim 6, wherein the reflection sheet is adhered and fixed to the inner surface in such a manner that at least two side edges of a surface of the reflection sheet facing the die-casted back plate are adhered and fixed to the inner surface.

8. The backlight assembly according to claim 6, wherein one of four side surfaces of the light-guiding plate is a light-entering side surface;
folded edges are arranged at three side edges of four side edges of the reflection sheet; and
the remaining side surfaces of the four side surfaces of the light-guiding plate except the light-entering side surface are adhered and fixed to the folded edges of the reflection sheet, respectively.

9. The backlight assembly according to claim 8, wherein the reflection sheet is adhered and fixed to the inner surface by using a first double-sided adhesive tape, and the folded edges are adhered and fixed to the side surfaces of the light-guiding plate by using a second double-sided adhesive tape.

10. The backlight assembly according to claim 1, further comprising a buffer, wherein the die-casted back plate comprises a bottom portion and a side portion together enclosing the accommodation space, and the buffer is located in a gap between the light-guiding plate and the side portion.

11. The backlight assembly according to claim 9, wherein the light-guiding plate and the reflection sheet are adhered and fixed to the buffer by using a third double-sided adhesive tape.

12. A display device, comprising a backlight assembly, wherein the backlight assembly comprises an optical lamination layer and a die-casted back plate, wherein the die-casted back plate defines an accommodation space for accommodating the optical lamination layer, and comprises an inner surface and an outer surface arranged opposite to each other, wherein the inner surface is a surface facing a bottom surface of the optical lamination layer, a recess region is arranged on the inner surface, and a plurality of rivets configured to assemble the die-casted back plate onto an object to be assembled is arranged on the outer surface; wherein the plurality of rivets is located in a region corresponding to the recess region and spaced apart from a boundary of the recess region by a spacing;
wherein a smooth transition structure is formed at a position where a level difference is formed between the boundary of the recess region and the remainder of the inner surface.

13. The display device according to claim 12, wherein the display device comprises a vehicle-mounted rotating screen.

14. The display device according to claim 12, wherein a central position of the recess region substantially coincides with a central position of the plurality of rivets.

15. The display device according to claim 12, wherein a minimum distance between a center of any one of the plurality of rivets and the boundary of the recess region ranges from 10 mm to 20 mm.

16. The display device according to claim 12, wherein a depth of the recess region in a direction perpendicular to the inner surface ranges from 0.2 mm to 0.3 mm.

17. The display device according to claim 12, wherein the optical lamination layer comprises a light-guiding plate, a reflection sheet and a light bar, the reflection sheet is located between the light-guiding plate and the die-casted back plate, the light bar is located at one side of the light-guiding plate and the reflection sheet, and a folded edge is arranged on at least one side of the other sides of the reflection sheet except the one side where the light bar is located, and is adhered and fixed to the light-guiding plate.

18. The display device according to claim 17, wherein the reflection sheet is adhered and fixed to the inner surface in such a manner that at least two side edges of a surface of the reflection sheet facing the die-casted back plate are adhered and fixed to the inner surface.

19. The display device according to claim 17, wherein one of four side surfaces of the light-guiding plate is a light-entering side surface;
   folded edges are arranged at three side edges of four side edges of the reflection sheet; and
   the remaining side surfaces of the four side surfaces of the light-guiding plate except the light-entering side surface are adhered and fixed to the folded edges of the reflection sheet, respectively.

20. The display device according to claim 19, wherein the reflection sheet is adhered and fixed to the inner surface by using a first double-sided adhesive tape, and the folded edges are adhered and fixed to the side surfaces of the light-guiding plate by using a second double-sided adhesive tape.

\* \* \* \* \*